T. D. LAKIN.
Ox-Yoke.
No. 36,882.                                Patented Nov. 4, 1862.
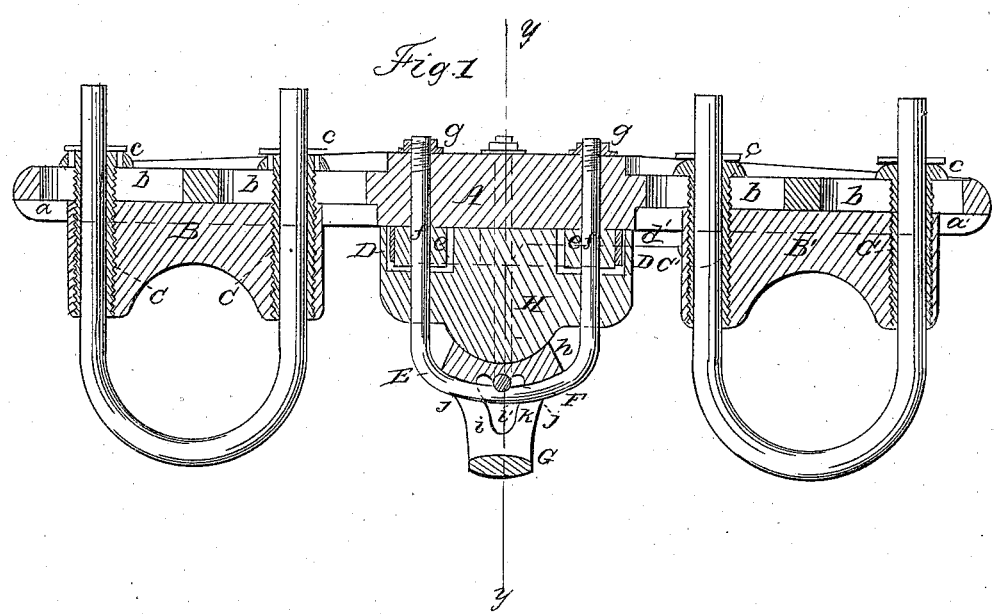
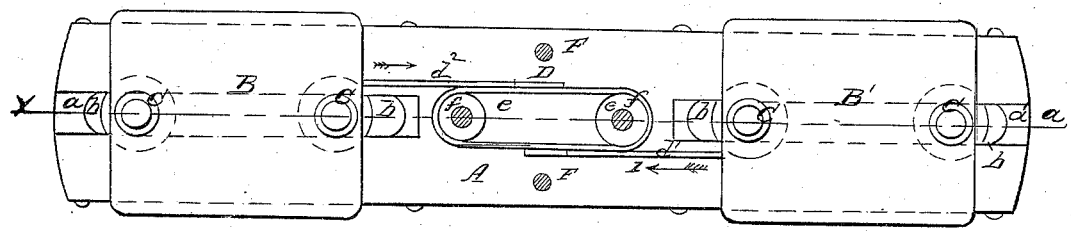
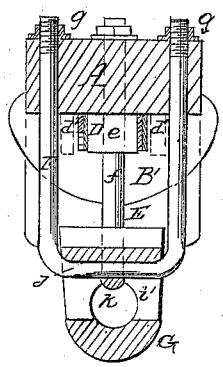
Witnesses
Geo. W. Reed
Timothy Shine
Inventor
T. D. Lakin
by Munn & Co.
Attys

UNITED STATES PATENT OFFICE.

TAYLOR D. LAKIN, OF HANCOCK, ASSIGNOR TO HIMSELF AND CHARLES WILDER, OF PETERBOROUGH, NEW HAMPSHIRE.

IMPROVEMENT IN OX-YOKES.

Specification forming part of Letters Patent No. 36,882, dated November 4, 1862.

*To all whom it may concern:*

Be it known that I, TAYLOR D. LAKIN, of Hancock, in the county of Hillsborough and State of New Hampshire, have invented a new and Improved Ox-Yoke; and I do hereby declare that the following is a full, clear, and exact description of the same, reference being had to the accompanying drawings, forming a part of this specification, in which—

Figure 1 represents a longitudinal vertical section of my invention, taken in the plane indicated by the line $x$ $x$, Fig. 2. Fig. 2 is a sectional plan or top view of the same. Fig. 3 is a transverse vertical section of the same, the plane of section being indicated by the line $y$ $y$, Fig. 1.

Similar letters of reference in the three views indicate corresponding parts.

This invention consists in the employment of hollow flanged thimbles, in combination with the slides and with the body of the yoke in such a manner that said thimbles form sockets for the ends of the bows, and also guides for the slides.

It consists, also, in the arrangement of two stirrups placed at right angles to each other, in combination with the staple that is intended to support the draft-pole, and which, while it rests on a smooth semicircular seat, is provided with three or more recesses in such a manner that by means of said stirrups the staple can be fastened in whatever position it may be brought.

To enable those skilled in the art to make and use my invention, I will proceed to describe its construction and operation with reference to the drawings.

The bar A, which forms the body of my yoke, is provided with grooves $a$ $a'$—one in each end and on its under side—and these grooves form the guides for the slides B B'. These slides are retained by tubular thimbles C, which screw into the same, and the upper ends of which pass through slots $b$ in the bar A, as clearly shown in Fig. 1 of the drawings. Flat round heads or flanges $c$ on the upper ends of said thimbles prevent the slides B B' falling out. The ends of the bows are inserted into the thimbles and retained by pins passing through them, or in any other convenient manner; and by these means the bows, together with the slides B B', can move in a direction toward or from the center of the bar A as far as the slots $b$ will permit.

Each of the slides connects with an endless belt, D, the slide B by means of a rod, $d$, on one, and the slide B' by means of a rod, $d'$, on the opposite side, and said belt is stretched over two pulleys, $e$, as clearly shown in Fig. 2 of the drawings. By this arrangement a motion of the slide B' in the direction of arrow 1 causes a corresponding motion of the slide B in the direction of arrow 2, and vice versa, and the slides are always kept at an equal distance from the center of the bar A. The endless belt D and connecting-rods $d$ $d'$ are superior to toothed racks and a pinion, because the latter create much friction, and they are liable to fill with dirt and wear out in a short time, and when worn out it is difficult to replace the same.

My endless belt works with very little friction, and it does not wear out for a long time; or if worn out it can be replaced with very little trouble and expense.

The pulleys $e$ rotate on the legs $f$ of a stirrup, E, which is fastened to the bar A by means of nuts $g$, and which, together with another stirrup, F, serves to retain the staple G and the cap H. The cap H covers the endless belt D and pulleys $e$, and it is provided with a semicircular seat, $h$, to receive the staple G. This staple is intended to hold the draft-pole, and it is provided with two slots, $i$ $i'$, running at right angles to each other to receive the stirrups E F. The slot $i'$, through which the stirrup F passes, is provided with three or more recesses, $j$, so that the position of the staple G can be changed toward one side or toward the other, as may be desired. The stirrup F is further secured in its position by the stirrup E, which passes through the slot $i$, and which is provided with a half-circular recess, $k$, to receive the stirrup F, as clearly shown in Figs. 1 and 3 of the drawings.

It must be remarked that the under surface of the staple G is perfectly smooth, so that it moves freely in the semicircular seat $h$, and it is firmly locked and held in place by the two stirrups E F.

Having thus fully described my invention, what I claim as new, and desire to secure by Letters Patent, is—

1. The arrangement of the hollow thimbles C, made to receive the bows, and provided with flanged heads c, in combination with the slides B B' and slotted bar A, substantially as and for the purpose specified.

2. The stirrups E F, arranged at right angles to each other, and applied in combination with the semicircular seat h, staple G, and recesses j, as and for the purposes set forth.

TAYLOR D. LAKIN.

Witnesses:
  GEO. A. HAMILTON,
  RICHARD EMERSON.